C. F. KETTERING AND W. A. CHRYST.
POWER PLANT.
APPLICATION FILED DEC. 8, 1919.

1,380,975

Patented June 7, 1921.
2 SHEETS—SHEET 2.

Witnesses
Irvin A. Greenwald
Warren Schmieding

Inventors
Charles F. Kettering and
William A. Chryst
by Kerr, Page, Cooper and Hayward
Attorneys

UNITED STATES PATENT OFFICE.

CHARLES F. KETTERING AND WILLIAM A. CHRYST, OF DAYTON, OHIO, ASSIGNORS, BY MESNE ASSIGNMENTS, TO DELCO-LIGHT COMPANY, OF DAYTON, OHIO, A CORPORATION OF DELAWARE.

POWER PLANT.

1,380,975.  Specification of Letters Patent.  Patented June 7, 1921.

Original application filed October 27, 1915, Serial No. 58,207. Divided and this application filed December 8, 1919. Serial No. 343,332.

*To all whom it may concern:*

Be it known that we, CHARLES F. KETTERING and WILLIAM A. CHRYST, citizens of the United States of America, residing at Dayton, county of Montgomery, and State of Ohio, have invented certain new and useful Improvements in Power Plants, of which the following is a full, clear, and exact description.

The present invention relates to an improvement in what may be termed lighting plants, and more particularly to that type of plant which includes a prime mover or engine, and an electric unit including a dynamo electric machine, a source of power and other devices.

This application is a division of our copending application Serial No. 58,207 filed October 27, 1915, patented May 25, 1920, No. 1,341,327.

An object of the present invention is to provide a combined engine and dynamo electric machine structure, wherein the crank shaft of the engine will be balanced on one end by means of a flywheel structure and on the opposite end by the armature of the dynamo electric machine, which armature, by reason of its substantial weight and consequent effect when in motion, cooperates with the engine fly wheel in balancing the engine operation. By this construction, the necessity of providing a bearing at the armature end of said crank shaft, is eliminated, which tends toward simplicity in construction and a reduction in manufacturing costs.

Further objects of the present invention are to provide a system of the type heretofore set forth, which will be extremely compact and simple in construction, and which may be manufactured at low cost, but which will be extremely durable and efficient in operation.

Further objects and advantages of the present invention will appear hereinafter, reference being had to the accompanying drawings, wherein a preferred form of embodiment of the present invention is clearly set forth.

Figure 1:
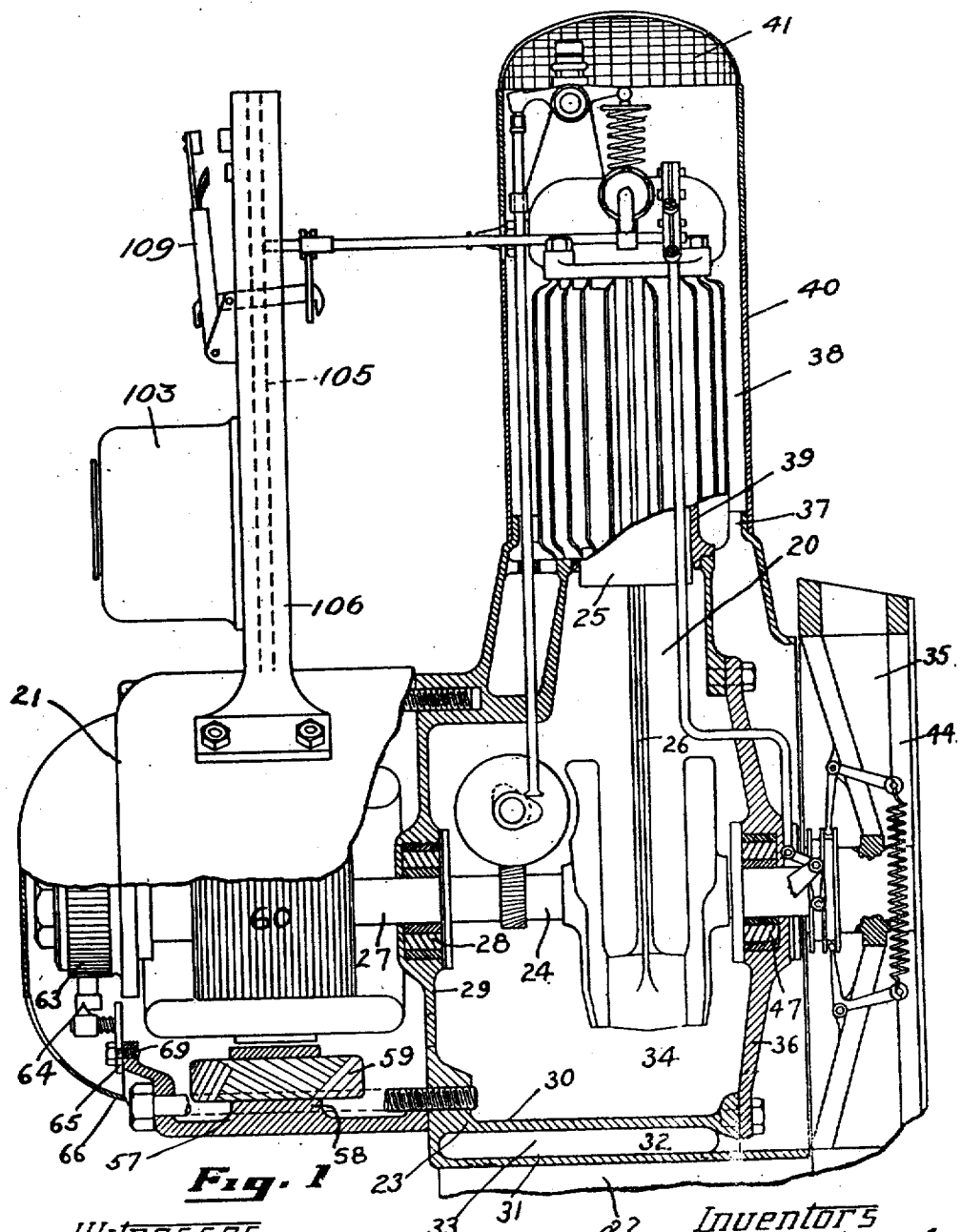
Figure 1 is a sectional view of the engine and dynamo electric machine embodied in the present invention, certain of the parts being shown in elevation for the sake of clearness.
Figure 2:
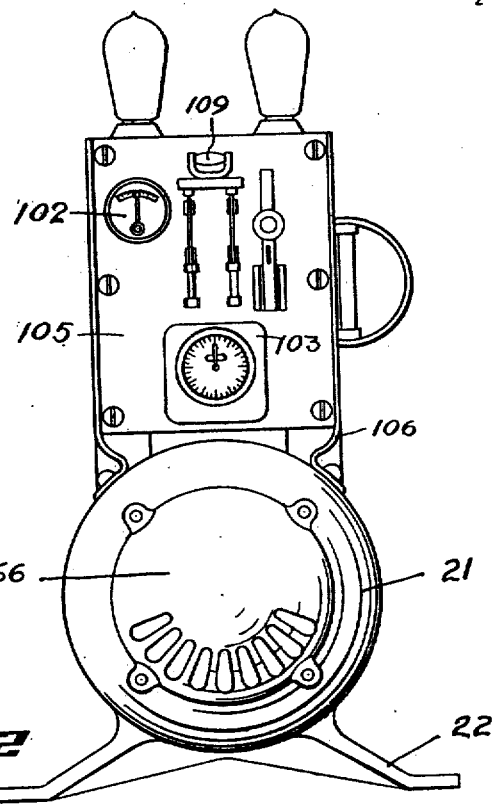
Fig. 2 is a view in end elevation of the power plant disclosed in Fig. 1.

Referring to the drawings, and particularly to Figs. 1 and 2, it will be noted that there is illustrated a power plant, including an engine 20, which may be of any suitable type, but which is shown in the present instance as comprising a single cylinder engine of the four cycle type. This plant also includes a dynamo electric machine 21, hereinafter referred to as an electric machine, directly coupled to the engine, and capable of operation, either as a motor or as a generator.

The engine 20 may be said to constitute a prime mover, which is adapted to be started by the operation of the electric machine as a motor, and which then is adapted to operate the electric machine as a generator to furnish current for any suitable purpose.

The engine in the present instance comprises a base 22, which may be separated from or formed with the engine casing or crank case 23 of the engine, and which supports not only the engine, but also the electric machine 21, upon which are mounted the electrical control devices for the power plant.

The crank case 23 is formed of a single casting, having inner and outer side and bottom walls 30 and 31 respectively. These walls are spaced apart by means of ribs 32, in such a manner as to form an air chamber 33 therebetween.

This air chamber extends completely around the crank case, but is inclosed at one end of the crank case by means of the end wall 29, which also acts as a closure for the crank case chamber 34. The air chamber, however, on the opposite end of the crank case, is left open so as to communicate with the fan structure 35, included in the fly-wheel 44 of the engine. This end of the crank case chamber 34 is closed by means of a removable head 36, which is secured to the inner wall 30 of the crank case.

Head 36 supports bearing 47 and end wall 29 supports bearing 28. Bearings 47 and 28 support engine crank shaft 24 connected by rod 26 with piston 25. One end of the shaft, designated by numeral 27, extends through bearing 28, and serves as the armature shaft for the generator to be described. Shaft 24 also projects through bearing 47 and supports fly-wheel 44, which is connected therewith in any suitable manner.

The air chamber 33 is also open as at the point 37, so as to communicate with the air chamber 38, formed by surrounding the engine cylinder 39 with the draft tube 40. The upper end of the tube 40 is left open to permit the air chamber to communicate with the outside atmosphere, although a guard 41, which is preferably a screen, is secured to the upper end of the tube 40.

Referring to Fig. 1, the electric machine 21 comprises an inclosing casing and field frame 57, carrying the pole shoes 58 and the field windings 59, (only one of the pole shoes and field coils being shown). This field frame is of the overhanging type, that is, it is supported from one end, and in the embodiment illustrated, it is shown as supported from the engine crank case by means of bolts or other preferred form of securing devices which hold the field frame removably, yet securely against the wall 29 of the crank case. The moving part or armature 60 of the electric machine is of substantial weight, as shown, and is removably mounted upon the extended end 27 of crank shaft 24, in any well known manner. The field frame, as shown, surrounds the armature and constitutes a protective casing for the same. As is evident from the drawings, the field frame may be readily removed and the armature laid bare merely by removing the field frame bolts.

Figure 3:
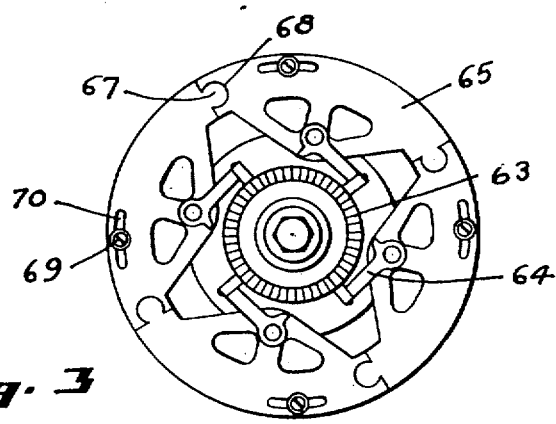
Fig. 3 is a detail view of the commutator brushes and the mounting therefor, and showing the relation of said brushes and their mounting to the commutator of the dynamo electric machine.

The armature is provided with the usual windings, and includes a commutator 63, which coöperates with suitable brushes 64, clearly shown in Fig. 3. Each of these brushes is mounted upon a plate 65. Each of these plates is provided with a tongue 67, which fits within a groove or opening 68, formed in the adjacent end of the next succeeding plate. In this manner a complete ring is formed, which is secured by means of bolts 69 to the frame 57 of the electric machine. These bolts 69 pass through elongated slots 70, formed in each plate, so that while it is possible to adjust the entire ring, and therefore all of the brushes, by loosening the respective bolts, it is impossible to adjust the respective brushes relative to each other.

The generator frame 57 supports a cover 66 inclosing the commutator and brush rigging. By removing cover 66, the brush rigging can be removed from the frame 57 and the armature can then be removed from the crank shaft.

The electrical control devices for the plant are supported upon the generator frame 57 in a convenient and accessible location as shown in the drawings. These control devices, which may include an ammeter 102, an ampere hour meter 103, a switch 109 or other desired instrumentalities, are mounted upon switchboard 105, and constitute a unit which is secured upon the generator frame by any suitable means such as a pair of brackets 106.

In the particular embodiment of the invention shown and described, the field frame or stationary part of the electric machine carries the field winding and the armature or movable part carries the armature winding, but this arrangement is merely illustrative and is not intended as importing any limitations on the meaning of the terms "field frame" and "armature" as employed in the specification and claims, it being understood by those skilled in the art that the terms field frame and armature as herein employed are synonymous with the terms stator and rotor, respectively, which are in general use in the art and which it is understood may carry other forms of windings than those herein disclosed, without in any way departing from the spirit and scope of the invention.

From the foregoing description, it is apparent that a power plant constructed in accordance with the present invention possesses numerous advantages among which may be mentioned the following:

1. The generator and engine are directly connected thereby eliminating the use of belts, chains and other forms of couplings.

2. No separate base is required for the electrical control devices and for the generator since the engine crank case supports both the control devices and the generator frame, thereby effecting a saving of material and increasing the accessibility, compactness and neatness of the parts mentioned, as well as rendering the plant as a whole more compact and portable.

3. The crank shaft is supported by only two bearings. This construction facilitates the alinement of the crank shaft bearings 4. The elimination of the third bearing at the commutator end of the crank shaft simplifies the lubrication problem and removes all liability of the commutator being covered with grease and oil.

5. The overhanging armature of substantial weight serves to balance forces set up in crank shaft and the crank case by the weight of the overhanging flywheel, and when in motion it functions as a flywheel member coöperating with the engine flywheel to balance and steady the engine operation, thereby permitting a reduction in the size and weight of the engine flywheel and a better arrangement of the parts.

6. The armature can easily be removed for inspection and repair by removing the cover 66 and the brush supporting plates 65.

7. The removability of the overhanging field frame and inclosing casing by merely removing the field frame bolts makes it easy to lay bare the armature and commutator and facilitates the repair or replacement of any of the parts mentioned.

8. The support of both the field frame and the armature in overhanging relation from the engine crank case facilitates the accurate centering and adjustment of the armature and field frame.

While the form of mechanism herein shown and described constitutes a preferred embodiment of one form of the invention, it is to be understood that other forms might be adopted and various changes and alterations made in the shape, size and proportion of the elements therein without departing from the spirit and scope of the invention.

What we claim is as follows:

1. In a device of the character described, the combination with an engine, including a crank case, crank shaft bearings and a crank shaft, one end of which projects beyond said bearings; of an electric unit including an armature fixedly mounted upon the projecting end of said crank shaft, and adapted to be driven thereby; and an overhanging field frame supported by the crank case about the armature, said field frame being open ended to permit the endwise removal of the armature.

2. In a power plant, the combination with an engine including a crank case having one end wall formed integrally therewith, said crank case being open at the other end; of a crank case cover plate; bearings in the end wall and cover plate; a crank shaft journaled in said bearings and extending beyond said end wall and cover plate; a flywheel carried by the shaft outside the cover plate; a generator armature supported by said shaft outside said end wall; and a generator field frame supported by said crank case.

3. In a power plant, the combination with an engine including a crank case having one end wall formed integrally therewith, said crank case being open at the other end; of a crank case cover plate; bearings in the end wall and cover plate; a crank shaft journaled in said bearings and extending beyond said end wall and cover plate; a flywheel carried by the shaft outside the cover plate; a generator armature removably supported by said shaft outside said end wall; a generator field frame supported by said crank case end wall; and brush rigging supported by said field frame.

4. In a device of the character described, the combination with an engine, including a crank case, crank shaft bearings and a crank shaft, one end of which projects beyond said bearings; of an electric unit including an armature mounted upon the projecting end of said crank shaft, and adapted to be driven thereby; and an inclosing casing for the armature supported from the engine and comprising a field frame removably supported about the armature and adapted to be removed as a whole to lay bare the armature.

5. A power plant having a prime mover and a dynamo electric machine adapted to be driven by the prime mover, comprising, in combination, an internal combustion engine having a crank case, an engine crank shaft supported on but two bearings and having its ends extending beyond the bearings and the crank case, an engine flywheel mounted on one extended end of the crank shaft, and an armature of substantial weight fixedly mounted on the oppositely extended end of the crank shaft.

6. In a device of the character described, the combination with an engine, including a crank case, crank shaft bearings and a crank shaft, one end of which projects beyond said bearings; of a dynamo-electric machine comprising an armature of substantial weight fixedly mounted upon the projecting end of the crank shaft, a commutator on said shaft beyond the armature, and a field frame secured directly to the crank case and overlying the armature.

7. In a device of the character described, the combination with an engine, comprising an engine casing, an engine crank shaft extending beyond the engine casing, and a bearing for said shaft carried by the casing; of a dynamo-electric machine comprising an armature of substantial weight mounted on the extended portion of said crank shaft and adapted to be driven thereby, and a field frame and inclosing casing surrounding the armature and secured to the engine casing, said field frame and inclosing casing being removable to lay bare the armature without dismounting the armature from the engine crank shaft.

8. A power plant comprising, in combination, an engine including an engine casing, an engine crank shaft having its ends extending on opposite sides of the engine casting, bearings for the crank shaft, and a flywheel mounted on one extended end of the crank shaft; a dynamo-electric machine comprising an armature fixedly mounted on the opposite extended end of the crank shaft and a field frame surrounding the armature and secured to the engine casing; and electrical control devices for the power plant supported from the engine casing.

9. A unitary power plant comprising, in combination, an engine including an engine casing, an engine crank shaft having one end extending beyond the engine casing, and bearings for the crank shaft; a dynamo-electric machine comprising an armature of substantial weight mounted on the extended end of the crank shaft, a field frame supported from the engine casing and overlying the armature, said field frame being open ended to permit the endwise removal of the armature; a switchboard supported on the power plant; and electrical control devices for the power plant mounted on the switchboard.

In testimony whereof we affix our signatures.

CHARLES F. KETTERING.
WILLIAM A. CHRYST.

Witnesses:
MILDRED PEARE,
ALVINA LEHMAN.